J. H. ELWARD.

Harvester.

No. 6,395. Reissued April 20, 1875.

Witnesses:
Alex Mahon
John G. Center

Inventor:
John H. Elward
by A. Ill. Smith
Attorney

THE GRAPHIC CO. PHOTO-LITH. 39 & 41 PARK PLACE, N.Y.

UNITED STATES PATENT OFFICE.

JOHN H. ELWARD, OF ST. PAUL, MINNESOTA, ASSIGNOR TO HIMSELF AND WAYLAND S. GOODHUE.

IMPROVEMENT IN HARVESTERS.

Specification forming part of Letters Patent No. 104,290, June 14, 1870; reissue No. 6,395, dated April 20, 1875; application filed March 24, 1875.

*To all whom it may concern:*

Be it known that I, JOHN H. ELWARD, (formerly of Polo, county of Ogle, State of Illinois, but now) of St. Paul, county of Ramsey, State of Minnesota, have invented certain new and useful Improvement in Harvesting-Machines, of which the following is a full, clear, and exact description, reference being had to the accompanying drawing making part of this specification, in which—

Figure 1:
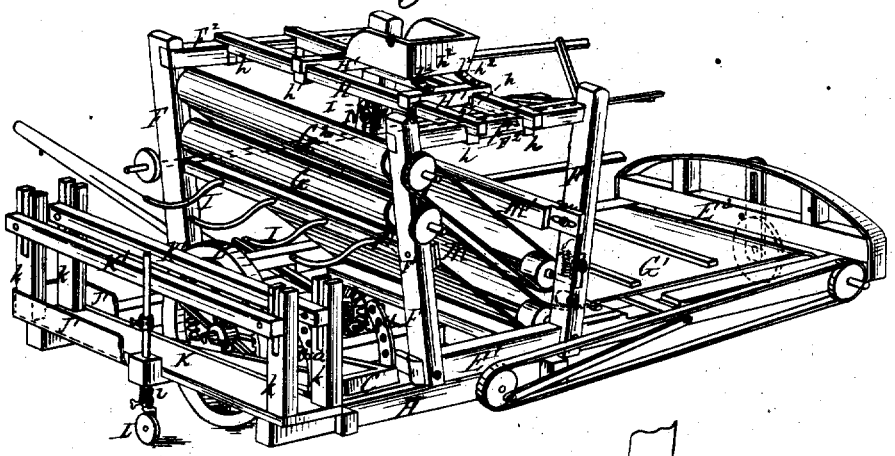
Figure 3:
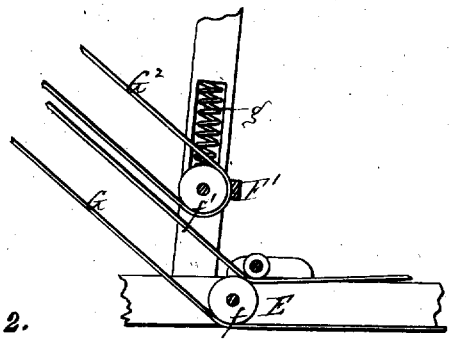
Figure 2:
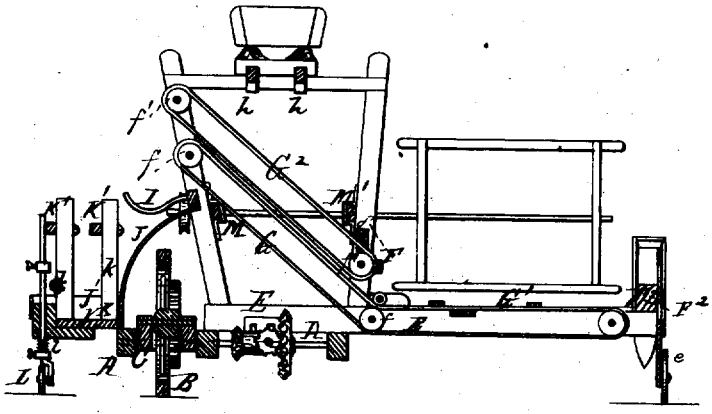

Figure 1 is a rear perspective view of my improved harvesting-machine. Fig. 2 is a transverse section of the same; and Fig. 3 is a portion of Fig. 2 enlarged.

Similar letters of reference denote corresponding parts in all the figures.

My invention relates to that class of harvesting-machines in which the grain is bound by hand upon the machine, and in which the grain is carried from the apron or platform upon which it falls, as it is cut, to the binders, at the outer or stubble side of the machine, by an elevating mechanism which, while carrying the grain to the binders, also gives it the required elevation for adapting it to be conveniently operated upon; and the invention consists, first, in the combination, with the elevator up which the grain is carried to the binders' grain-receptacle at the outer side of the machine, of an upper yielding apron held down for compressing the grain and holding it to the elevator by means of springs which allow said apron or cover to yield to the varying bulk of the grain; second, in the combination, with a binders' platform arranged on the outside of the main frame, of adjustable longitudinal bars or supports for the binders standing on said platform; third, in an inclined or curved shield or guard for covering the outer face of the drive-wheel, when said shield is arranged underneath the grain-receiver, and provided at its foot with a box or receptacle to receive the grain shattered or shaken out upon the apron and in the process of delivery and binding; fourth, in a novel arrangement of adjustable reel-supports, whereby the angle of relation of the reel to the line of the cutters can be changed to adapt it to leaning grain, as hereinafter set forth; fifth, in a novel means for effecting the adjustment of the driver's seat for the purpose of properly balancing the machine and counterbalancing the weight of the binders, by giving to such driver's seat both a lateral and longitudinal adjustment, as will be described.

To enable others to understand and use my invention, I will proceed to describe the same with reference to the drawing, in which—

A represents the main frame of the machine which has the cutting apparatus attached, and carries the gearing in the usual manner. The main drive-wheel B is mounted in a supplemental frame, C, which is pivoted at its forward end in the main frame A, in line with the pinion or bevel-wheel shaft D, the axle of said wheel being supported in bearings in the supplemental frame in rear of its pivotal support, and the rear end of frame C is made adjustable and can be set at any desired point for adjusting the height of the main frame and cutting apparatus by means of pins or bolts passing through the frame, and through curved perforated standards *a a* attached to the frame A. The finger-bar E is rigidly attached, at its inner end, to the forward end of the frame A, and to the rear end of said frame is attached a bar, $E^1$, which extends laterally therefrom parallel with the finger-bar. To the outer ends of these bars a longitudinal bar, $E^2$, is connected, which supports the usual divider and the adjustable carrying-wheel *e*. The inner ends of bars E $E^1$, in this instance, have attached to them uprights F F, in bearings, in which are mounted rollers *f* $f^1$, one set of which, *f*, carries the inclined lower or main grain-delivery apron G, and the other set carries the upper inclined apron $G^2$.

The lower shaft (or both upper and lower, if desired) of this apron is mounted in a slotted bearing in uprights F, and springs *g* serve to hold it and the apron down with a yielding pressure upon the grain passing between the aprons G $G^2$, thereby adapting them to the varying bulk of the grain. $G^1$ is the platform-apron, upon which the grain falls as it is cut, said apron forming either a horizontal extension of the inclined apron G, or made separate, and conveying the grain to the inclined aprons, as may be preferred. The uprights F are connected by longitudinal bars at $F^1$, and at their tops by transverse bar $F^2$. On the bars $F^2$ are mounted adjustable longitudinal seat-bars H, which are connected with bars $F^2$ by loops *h*, which permit said seat-bars to slide laterally on bars $F^2$. The bars H, in turn, have short transverse bars H′ mounted upon and connected with them by sliding loops or boxes $h^1$, which permit a longitudinal movement of the seat mounted thereon, or on springs $h^2$, connecting said transverse seat-bars.

By this arrangement a lateral adjustment of the seat is provided for to counterbalance, when necessary, the weight of the binders, hereinafter referred to, and also a longitudinal adjustment for effecting the proper balancing of the weight of the machine. I I are a series of curved rods forming a grain-receptacle, said rods or arms being attached to longitudinal bar $F^1$, just underneath the delivery end of the inclined aprons G $G^2$, in position to receive the grain discharged therefrom, and directly underneath said rods or receptacles is placed a guard or shield, J, which curves or is inclined outward or downward, as shown in Fig. 2, extending from a point underneath the delivery end of the discharging-aprons to a box or receptacle attached to or formed by the binders' platform, which may be inclosed, as represented at J′, for the purpose of receiving and saving the shattered grain.

By this arrangement a great saving of grain is effected, it having been found in practice that where the grain is dry and well cured before it is harvested, the saving effected in this manner is frequently sufficient to cover the cost of binding the grain. K is the binders' platform, which is adapted to carry the binders in the following manner: *k k* are slotted uprights, mounted on the four corners of said platform, and connected at their upper ends by longitudinal bars or supports K′, which are made adjustable upon the slotted upright *k*, and are retained at the desired height to adapt them to the height of the binders by means of set-screws or other equivalent device for that purpose.

These bars, it will be seen, extend from end to end of the frame of the machine, or the extension thereof, on which the binders' platform is mounted, and afford a convenient and secure support for any desired number of binders standing on the platform K. The position of the binder will, of course, be optional. He can either stride one of the bars or stand between them, and thus be supported on both sides while grasping and binding, in his turn, the sheaves presented to him in receptacle I. The binders' platform rests at its outer edge upon a caster-wheel, L, on the shank of which, and between the wheel and platform, is a spring, *l*, which allows the wheel to yield when passing over an obstruction or slight elevation, which would otherwise lift the main drive-wheel from the ground. This wheel also serves to prevent the weight of the binders from overturning the machine when the machine is working on a hill-side or falls into a sudden depression.

The reel employed is of the class usually termed an overhung reel—that is, one the shaft of which is mounted in bearings at its inner or main-frame end only. Said reel-shaft is mounted in adjustable longitudinal bars M M′, slotted longitudinally at their rear ends, and connected to the rear uprights F F by set-screws, as shown at *m*, to permit independent longitudinal adjustment for varying the angle of relation of the reel to the line of the cutters, thereby adapting it to the condition of the grain where such grain leans either toward or from the main frame. The forward ends of the reel-support M M′ are supported in vertically-adjustable brackets N, which afford means for giving the desired vertical adjustment to the reel.

The upright frame F F, carrying the apron and reel, together with the several other parts above described, for adapting the machine to deliver the grain to, and to be bound by, men riding upon the machine, are all connected with the main frame in such manner that they can be readily removed where it is desired to adapt the machine to be used as a mower. The changes necessary for this purpose will be understood by those accustomed to the use of these machines, and need not be described here.

From the foregoing description it will be seen that the tables upon which the grain is usually bound in this class of machines are dispensed with, and the grain is bound in the arms of the attendants in a manner similar to that employed where the grain is bound after it has been discharged upon the ground. The grain is, however, presented to the binders in an elevated receiver, thereby obviating the necessity for stooping to pick it up, as is the case where it is discharged upon the ground.

By the employment of the adjustable longitudinal bars or supports for the binders the binders are enabled to vary their positions to suit themselves to the varying condition of the grain, and, at the same time, by such change to relieve themselves of the fatigue consequent upon the necessity hitherto existing of remaining for hours together in one unvarying position while binding the grain on the machine.

Having now described my invention, what I claim as new, and desire to secure by Letters Patent of the United States, is—

1. An elevator for conveying the grain to a a receptacle at the outer side of the machine, in combination with a yielding apron held or pressed toward the elevator by springs which allow it to yield to the varying bulk of the grain, substantially as described.

2. The adjustable longitudinal bars or supports $K^1$, in combination with the binders' platform, substantially as described.

3. The binders' platform K, in combination with a box or receptacle for the shattered grain, supported upon said platform, and the curved or inclined shield J, covering the outer face of the driving-wheel, and conducting the shattered grain into the receptacle or box, substantially as set forth.

4. The arrangement of the longitudinally-adjustable bars or reel-supports M M′, in combination with the overhung reel for adjusting the angle of relation of the reel to the line of the cutters, as set forth.

5. The adjustable driver's seat, mounted on the bars H H′, substantially as described, for giving both a lateral and longitudinal adjustment to said seat, as set forth.

6. The combination, with a binders' platform or support at the outer or stubble side of the main frame, and in the described relation to the raking and elevating mechanism, of an adjustable driver's seat arranged at the grain side of the drive-wheel, and in the same transverse vertical plane with said binders' platform and raking mechanism, whereby the machine may be balanced, substantially as described.

JOHN H. ELWARD.

Witnesses:
JOHN G. CENTER,
ALEXANDER MAHON.